(12) United States Patent
Simmons

(10) Patent No.: US 9,416,807 B2
(45) Date of Patent: Aug. 16, 2016

(54) MODULAR, FACETED, BLOCK-AND-SHELL NODE SYSTEM FOR CONNECTING ELONGATE FRAME ELEMENTS

(71) Applicant: ConXtech, Inc., Hayward, CA (US)

(72) Inventor: Robert J. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 194 days.

(21) Appl. No.: 14/193,359

(22) Filed: Feb. 28, 2014

(65) Prior Publication Data

US 2014/0270918 A1    Sep. 18, 2014

Related U.S. Application Data

(60) Provisional application No. 61/780,943, filed on Mar. 13, 2013.

(51) Int. Cl.
*E04B 1/19* (2006.01)
*F16B 7/04* (2006.01)
*F16B 7/18* (2006.01)

(52) U.S. Cl.
CPC .............. *F16B 7/185* (2013.01); *E04B 1/1903* (2013.01); *F16B 7/048* (2013.01); *Y10T 403/342* (2015.01); *Y10T 403/42* (2015.01)

(58) Field of Classification Search
CPC . A47B 47/0016; E04B 1/1903; E04B 1/1906; E04B 1/1912; E04B 1/5831; E04B 2001/1957; E04B 2001/2406; E04B 2001/2676; E04B 2001/3247; E04B 2001/5881; F16B 7/044; F16B 7/048; F16B 7/185; F16B 2012/443; F16B 2012/446; Y10T 403/43–403/45; Y10T 403/42; Y10T 403/7005; Y10T 403/7007; Y10T 403/7015; Y10T 403/7096

USPC ......... 403/169–178, 205, 348, 349, 353, 382, 403/403
See application file for complete search history.

(56) References Cited

U.S. PATENT DOCUMENTS

| 835,059 A | 11/1906 | Curley et al. |
| 925,677 A | 6/1909 | Belcher |

(Continued)

FOREIGN PATENT DOCUMENTS

| DE | 2348239 A1 * | 4/1974 | ......... A47B 47/0016 |
| DE | 2758992 A1 | 7/1979 | |

(Continued)

OTHER PUBLICATIONS

U.S. Patent and Trademark Office, Office action regarding U.S. Appl. No. 14/160,797, Aug. 18, 2014, 24 pages.

(Continued)

*Primary Examiner* — Josh Skroupa
(74) *Attorney, Agent, or Firm* — Kolisch Hartwell, P.C.

(57) ABSTRACT

A modular, faceted-component node system for uniting adjacent ends of elongate frame elements at selectively different types of frame-element-junction nodes in a frame structure including (a) a first type faceted node component adapted for attachments to it of ends of plural, elongate frame elements, operable as a singularity to form in a frame structure a first-type frame-element-junction node, and a second type faceted node component for joining, and cooperating with, different pluralities of the first-type node component to form, selectively with such component pluralities, in a frame structure a plurality of different, second-type frame-element-junction nodes—the first and second type node components including, respectively, concave and convex, angularly faceted surface regions that are complementary to one another, and that accommodate facet-to-facet, matching-facet-coextensive, selective joinder of the two component types.

22 Claims, 8 Drawing Sheets

(56) References Cited

U.S. PATENT DOCUMENTS

Figure 1:
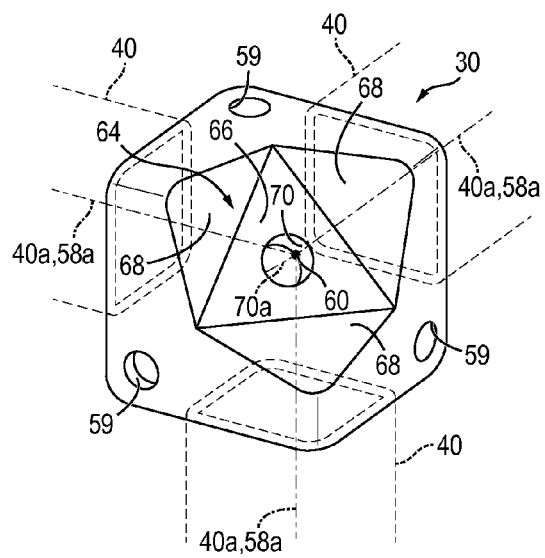

| | | |
|---|---|---|
| 1,110,185 A | 9/1914 | Brown et al. |
| 1,367,044 A | 2/1921 | Hausler |
| 1,400,066 A | 12/1921 | Huck |
| 1,471,094 A | 10/1923 | Bloss |
| 1,729,743 A | 5/1927 | Jorgensen et al. |
| 2,008,087 A | 7/1935 | Stromberg |
| 2,569,653 A | 10/1951 | Boedecker |
| 3,071,205 A | 1/1963 | Becks, Jr. |
| 3,148,477 A | 9/1964 | Bjorn et al. |
| 3,270,997 A | 9/1966 | Gethmann |
| 3,396,499 A | 8/1968 | Biffani |
| 3,401,739 A | 9/1968 | Opletal |
| 3,410,044 A | 11/1968 | Moog |
| 3,533,592 A | 10/1970 | Jennings |
| 3,562,988 A | 2/1971 | Gregoire |
| 3,664,011 A | 5/1972 | Labastrou |
| 3,685,866 A | 8/1972 | Patenaude |
| 3,706,169 A | 12/1972 | Rensch |
| 3,784,151 A | 1/1974 | Steele |
| 3,829,999 A | 8/1974 | Bernstein |
| 3,977,801 A | 8/1976 | Murphy |
| 4,019,298 A | 4/1977 | Johnson, IV |
| 4,059,931 A | 11/1977 | Mongan |
| 4,395,154 A | 7/1983 | Phillips et al. |
| 4,577,449 A | 3/1986 | Celli |
| 4,684,285 A | 8/1987 | Cable |
| 4,701,131 A | 10/1987 | Hildebrandt et al. |
| 4,742,665 A | 5/1988 | Baierl |
| 4,754,712 A | 7/1988 | Olson et al. |
| 4,821,844 A | 4/1989 | Huffman et al. |
| 4,830,144 A | 5/1989 | Werner |
| 4,852,501 A | 8/1989 | Olson et al. |
| 4,905,436 A | 3/1990 | Matsuo et al. |
| 5,061,111 A | 10/1991 | Hosokawa |
| 5,240,089 A | 8/1993 | Spera |
| 5,244,300 A | 9/1993 | Perreira et al. |
| 5,289,665 A | 3/1994 | Higgins |
| 5,342,138 A | 8/1994 | Saito et al. |
| 5,580,181 A * | 12/1996 | Nomura ............. A47B 47/0016 403/170 |
| 5,590,974 A | 1/1997 | Yang |
| 5,605,410 A | 2/1997 | Pantev |
| 5,617,931 A | 4/1997 | Zygmun et al. |
| 5,678,375 A | 10/1997 | Juola |
| 6,082,070 A | 7/2000 | Jen |
| 6,092,347 A | 7/2000 | Hou |
| 6,106,186 A | 8/2000 | Taipale et al. |
| 6,219,989 B1 | 4/2001 | Tumura |
| 6,378,265 B1 | 4/2002 | Konstandt |
| 6,390,719 B1 | 5/2002 | Chan |
| 6,554,102 B2 | 4/2003 | Schworer |
| 6,581,892 B2 | 6/2003 | Carnevali |
| 6,651,393 B2 | 11/2003 | Don et al. |
| 6,802,169 B2 | 10/2004 | Simmons |
| 6,837,016 B2 | 1/2005 | Simmons et al. |
| 6,913,422 B2 | 7/2005 | Rogers |
| 7,021,020 B2 | 4/2006 | Simmons et al. |
| 7,032,712 B2 | 4/2006 | Schworer |
| 7,941,985 B2 | 5/2011 | Simmons |
| 8,011,150 B2 | 9/2011 | Luttrell et al. |
| 8,161,707 B2 | 4/2012 | Simmons |
| 8,297,002 B2 | 10/2012 | Fernández Fernández |
| 8,671,644 B2 * | 3/2014 | Huang ................ A47B 13/06 403/170 |
| 2004/0237439 A1 | 12/2004 | Powell |
| 2005/0066612 A1 | 3/2005 | Simmons |
| 2007/0256391 A1 | 11/2007 | Mifsud et al. |
| 2008/0245023 A1 | 10/2008 | Simmons |
| 2009/0052980 A1 | 2/2009 | Williams |
| 2010/0316441 A1 | 12/2010 | Vicentelli |
| 2012/0110947 A1 | 5/2012 | Simmons |
| 2012/0160137 A1 | 6/2012 | Linares |
| 2012/0292131 A1 | 11/2012 | Lovas |
| 2013/0319796 A1 | 12/2013 | Davis |

FOREIGN PATENT DOCUMENTS

| | | | |
|---|---|---|---|
| DE | 9210290 U1 * | 10/1992 | ............ E04B 1/1906 |
| DE | 102009050139 A1 | 4/2011 | |
| FR | 2590943 A1 * | 6/1987 | ......... A47B 47/0016 |
| GB | 2261651 A | 5/1993 | |
| WO | WO 8902958 A1 * | 4/1989 | ............ E04B 1/1906 |
| WO | 2011047830 A1 | 4/2011 | |

OTHER PUBLICATIONS

ConXtech. 'ConX Modular Pipe Rack' [online]. Jan. 6, 2013. Retrieved from the internet: <http://www.conxtech.com/conx-system/conx-modular-pipe-rack/>; p. 1, figure 1, paragraphs 1, 2; p. 2, paragraph 1. 3pp.

ConXtech Brochure. 'CONX Modular Pipe Rack' [online]. Apr. 16, 2014. Retrieved from the internet: <http://www.conxtech.com_wp-content_uploads_files_documents_ConX_Modular_Pipe_Rack_Brochure.pdf>; entire document. 25pp.

U.S. Patent and Trademark Office, Office action regarding U.S. Appl. No. 14/163,778, dated Oct. 1, 2014, 29 pages.

The International Bureau of WIPO, International Preliminary Report on Patentability regarding PCT Patent Application No. PCT/US2014/019345, dated Sep. 24, 2015, 6 pages.

* cited by examiner

MODULAR, FACETED, BLOCK-AND-SHELL NODE SYSTEM FOR CONNECTING ELONGATE FRAME ELEMENTS

CROSS-REFERENCE TO RELATED APPLICATION

This application claims filing-date priority to U.S. Provisional Patent Application Ser. No. 61/780,943, filed Mar. 13, 2013, for "Tetra-Facet, Geode-Cradle-Nestable, Block-And-Shell, Container-Frame-Nodal Connector Structure", the entire disclosure content in which is hereby incorporated herein by reference.

BACKGROUND AND SUMMARY OF THE INVENTION

This invention pertains to a modular node system, also referred to as a nodal system, and as a node (or nodal) assembly system, for interconnecting, at their ends, elongate, linear frame elements to form open frame structures of various types. In particular, the invention relates to such a system, also called a system for forming a nodal connection between elongate structural elements, which features specially concavely and convexly faceted, complementarily fittable and joinable node components, referred to herein as node block and node shell components, usable, with great versatility, to create nodes and node assemblies for linking, at junctures, called, variously herein, frame-element junctures, and in certain instances combinational frame-element junctures, or connections, the ends of such frame elements in different, freely user-selectable forms of frame structures.

The invention further contemplates a nodal system of the type described which offers, as matters of user choice, (a) special, pre-formation organizational characteristics in relation to forming a frame structure, and (b), as designedly incorporated in a formed frame structure, potentially useful, distributed, differential load-bearing characteristics. As will be seen, these selectively implementable, special organizational and possibly useful load-bearing characteristics are uniquely related to, and spring dependently from, the respective natures of the proposed node block and node shell components in relation to how these two kinds of components offer collaboration both with one another, and with elongate frame elements employed in frame-structure construction. These (a) and (b) system offerings of the present invention will be more fully discussed later herein.

As will become apparent, the system of the invention is easily scalable, as needed, to work effectively with such different frame-structure sizes and arrangements.

A node block component is also referred to herein as a node block, as a block, and as a block structure, and a node shell component is also referred to as a node shell, as a shell, as a shell structure, and variously, depending upon nodal application, as a full, or fractional (one-half, or one-quarter) node shell globe component. The term "block" has been selected as a naming reference regarding the node block component to reflect the fact that this component, in a currently preferred embodiment of the invention, fundamentally, has a cubic, block-like, overall form. The terms "shell" and "globe" have been chosen as naming terms that are used at different text points herein with the other system components because of the fact that these other components, which, though different in size and specific shape, have certain similarities to one another, commonly possess relatively thin-walled, concavo-convex, spatial configurations that are somewhat suggestive of various full- or partial-globular, shell-like forms.

While the system of the invention is employable in a wide variety of frame styles and configurations, and is readily useable also with various styles of elongate frame elements (i.e., tubes having different cross-sections, I-beams, solid bars, etc.), a currently preferred system embodiment, which has been found to be useful in many applications, is described and illustrated herein in relation to interconnecting, at their ends, elongate, orthogonally disposed, square cross-section, linear, tubular frame elements to form open, rectilinear frame structures, such as box-container-style frame structures, of selectably different sizes and arrangements.

In this preferred embodiment, a node block, which is of singular design for all purposes, features an operative, concave facet structure, referred to herein generally as a cradle, and is configured for direct attachment, as by welding, to the ends of three, orthogonally arranged frame elements. A node shell, of which there are plural (i.e., three), related designs, each of which features an operative, convex facet structure having faceted portions, or regions, designed to seat, or nest, complementarily in a node block's cradle, is employed, in what may be referred to as a "node-shell-facet to node-block-facet" contacting/seating manner, to join different pluralities of node blocks, with one of these designs (one-quarter-globular) being configured to join two node blocks, a second (one-half-globular) being configured to join four node blocks, and the third (full-globular) being configured to join eight node blocks.

In a frame structure which has been assembled utilizing the node system of the present invention, every nodal connection includes at least one node block, with certain nodal connections each including only one node block and no other node component, and certain other nodal connections, which may be referred to as plural-component connections, including plural node blocks (as appropriate for the specific connection) interconnected through one or more system node shell(s).

As will become apparent, significant to the utility of the present invention are the respective concave and convex, faceted characters just mentioned of the included node block and node shell components. These component-faceted characters positively define and promote appropriate, complementary, facet-to-facet, inter-component seated positional registry, for joinder one to another, of adjacent node blocks and node shells. Faceting of the node block and node shell components also enhances multidirectional load bearing and transmission through node assemblies formed by these two types of components in a frame structure.

In general terms, the invention may thus be described as a modular, faceted-component node system for interconnecting, at what are referred to as frame-element junctions (or junctures), elongate, frame elements having ends, including (a) a first type faceted node component adapted for receiving attachments to it of adjacent ends, one each, of plural, elongate frame elements, and (b) a second type faceted node component for joining different pluralities of the first-type node component to form a node assembly (frame-element junction, or juncture)—the first and second type node components including, respectively, concave and convex, angularly faceted surface regions that, as just mentioned above, are complementary to one another, and that accommodate coextensive, facet-to-facet joinder of the two component types in combinational frame-element junctures. The first type node component is the above mentioned node block component, and the second is the node shell component.

As mentioned above, these two node components, in addition to offering, as a part of the present invention, special, new kinds of nodal connections for the junction-uniting of elongate frame elements in a formed frame structure, contribute uniquely, both individually and collectively, to offering certain, user-chooseable, frame-structure possibilities identified as (a) special frame-organizational and (b) potentially designedly useful, distributed, differential load-bearing, characteristics within a frame structure.

The frame-organizational characteristic involves the fact that every nodal connection created in a frame structure, in accordance with preferred practice of the present invention, includes one or more of the node block components, each of which receives, anchored to it on orthogonally-related block faces, the ends of three, orthogonally outwardly-extending, elongate frame elements. Each node block and its anchored and associated three frame elements thus can be thought of as being a kind of "spider-like" (central body with three legs), unified, nodal, frame-building unit—a unit which might usefully be treated in certain applications as a readily prefabricatable and deliverable "building block" for assembly of a frame structure.

Emphasizing this point as relating to an interesting contribution to the art made by the present invention, such a "spider" unit "building block", or appropriate plural versions of such a unit, or building block, all properly pre-dimensioned, could well define, at user selection, a modular, convenient and efficient, pre-assembled-componentry approach for final-assembly-intended delivery to a site of, among other relevant things, pre-formed spider units for the completion at that site of a selected frame structure.

The second-mentioned characteristic, a designedly differentially distributed load-bearing characteristic, which is somewhat linked to an aspect of the just-mentioned first characteristic, results when, as one might envision it for thought purposes, the node blocks in plural "spider units" (whether pre-assembled, or later-assembled during frame-structure formation) are united in different ways through the node shell system components to form various-complexity, frame-element nodes. It involves the fact that such nodal unitings, because of the respective natures of the node block and node shell components of the invention, produce a special quality of distributed and varied load-bearing robustness in an assembled frame structure—a varied robustness which is related to the numbers of vertical and horizontal frame elements that become linked at different, common nodal connections distributed throughout a frame structure, which varied robustness concept will be more fully described later herein.

From another, and more specific, point of view, the nodal aspect of invention may be characterized as a modular, node system featuring interengageable, faceted node components for interconnecting elongate, frame elements having ends and long axes, this system and its featured node components including:

(a) a node block having (1) an outwardly facing, faceted cradle formed with plural, adjacent, planar facets, and (2) outwardly facing, X, Y and Z element-attaching sites defining orthogonal, X, Y and Z attaching axes, each attaching site being designed to accommodate endo-attachment to the block of an elongate frame element with the long axis of such an attached element substantially coinciding with the attaching axis defined by the site, these attaching axes meeting at an intersection point which is spaced outwardly of the block relative to, and contained within a line extending centrally from, the block's cradle, and the attaching sites being configured whereby a frame element attached to a site extends in its entirety from the node block oppositely away from both the cradle and the intersection point; and (b) faceted shell structure formed with plural, adjacent, planar facets, shaped and adapted for joining plural, adjacent node blocks whose cradles are adjacent one another through anchored, coextensive, facet-to-facet, complementarily-nested seating of the shell structure in the adjacent cradles in adjacent blocks.

As stated earlier herein, frame structures employing the node system of the present invention may, in accordance with user preferences and designs, assume many different forms, two of which forms—a ground-supported frame structure, and a container frame structure designed for highway-tractor towing—are presented herein as representative examples.

The various features and advantages that are offered by, and obtained by use of, the present invention will now become more fully apparent as the detailed description of it which follows below is read in conjunction with the accompanying drawings

DESCRIPTIONS OF THE DRAWINGS

FIG. 1 is an isometric corner view picturing a node block component, or node block, constructed in accordance with a preferred embodiment of the system of the present invention, showing a corner of this block which is formed with an included tetra-facet cradle, slightly angled toward the right as seen by, but nonetheless nearly directly facing, the viewer of this figure. FIG. 1 includes dash-dot-line illustrations of four, single-point intersecting axes that are associated with the node block, and discussed below.

Figure 2:
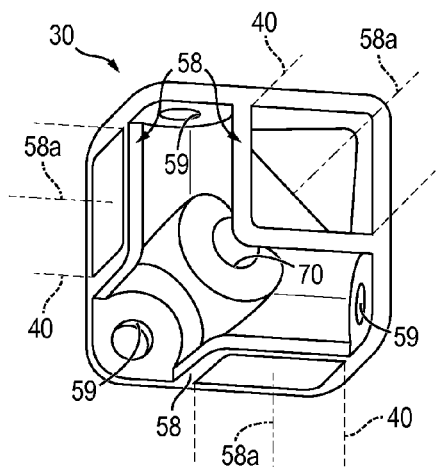

FIG. 2 provides another view of the node block of FIG. 1, presented essentially from a relatedly slightly rotated, diagonally opposite corner of that block. In this figure, three, included, outwardly facing, frame-element attaching sites, referred to herein as X, Y and Z frame-element attaching sites, defining orthogonal, X, Y and Z attaching axes, each attaching site being designed to accommodate endo-attachment to the block of an elongate frame element with the long axis of such an attached element substantially coinciding with the attaching axis defined by the site.

Figure 3:
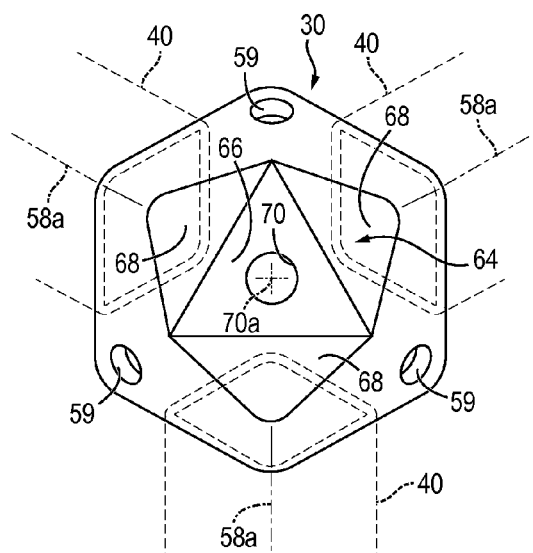

FIG. 3 is a node block corner view similar to that presented in FIG. 1, except that in this figure the node block is pictured with its tetra-facet cradle directly facing the viewer along the axis (a cross mark in the figure) of a threaded throughbore which is furnished centrally in the central, equilateral-triangular facet that forms part of the mentioned tetra-facet cradle in the block. The throughbore axis is one of the four axes mentioned in the description of FIG. 1.

Figure 4:
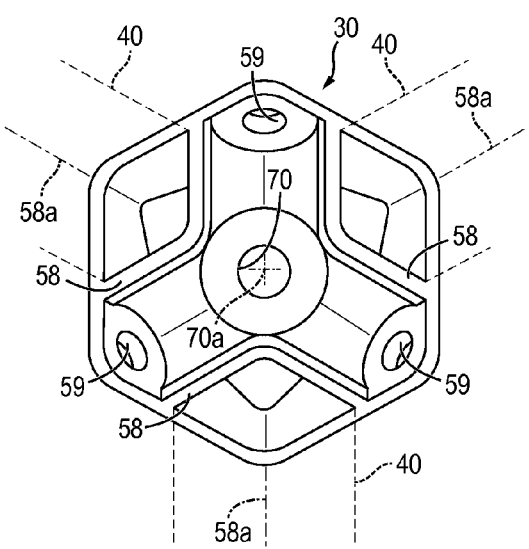

FIG. 4 presents a diagonally opposite-corner view of the node block of the invention relative to how that block is shown in FIG. 3, again presenting the viewer of this figure with a look directly along the just-mentioned throughbore axis associated with the central facet in the node block tetra facet, and also clearly picturing the previously mentioned frame-element endo attaching sites for three, orthogonally disposed elongate frame elements.

Certain dashed lines drawn in FIGS. 1-4, inclusive, illustrate end fragments of three elongate frame elements in place relative to the pictured node block.

Figure 5:
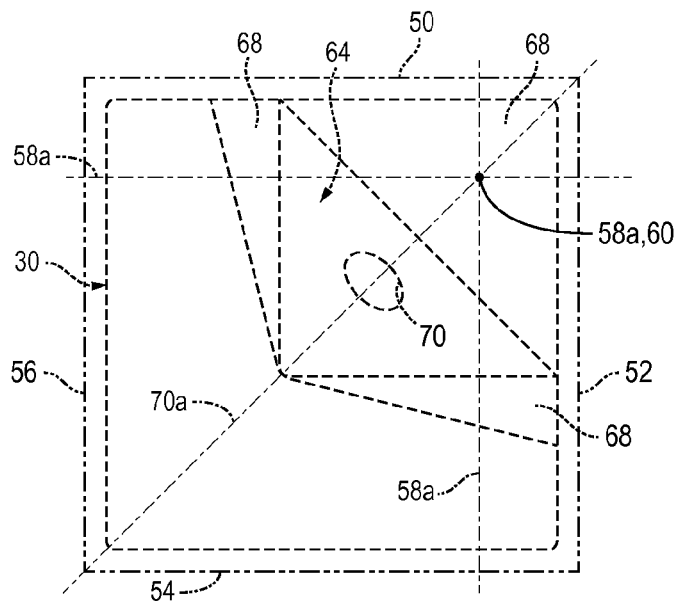

FIG. 5 is a stylized, and somewhat larger-scale, schematic, side elevation (in dashed lines) of one side of the node block of FIGS. 1-4, inclusive, showing the preferred-embodiment cubic form (but not the only form which a user could choose) of this node block, residing illustratively within what may be thought of as a defining, six-orthogonal-plane-intersecting, virtual cube, referred to herein as a nominal cubic volume, and showing the earlier-mentioned, four-axis point of intersection which "sits" within this virtual cube. In FIG. 5, an exaggerated gap is shown between the block and the virtual cube in order that the outline of the block can clearly be seen within the surrounding cube.

Figure 6:
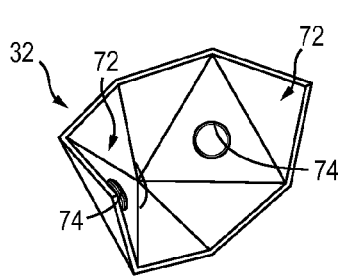
Figure 7:
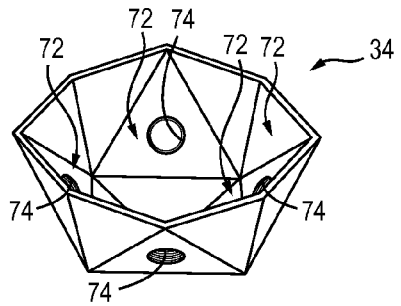
Figure 8:
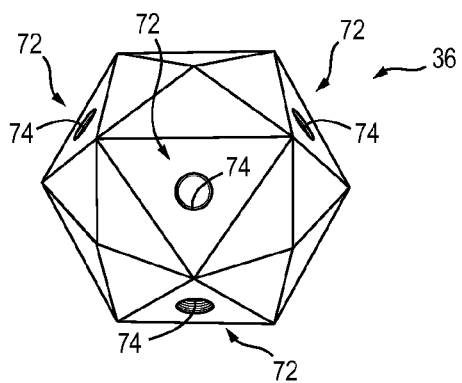

FIGS. 6-8, inclusive, show isometrically, and respectively, the three, different, but related-style, partial, and whole, "globe", or "globular", configurations proposed for the faceted node shell components (structures) proposed by the present invention, with FIG. 6 illustrating what is called herein a one-quarter-globe (globular) configuration of the node shell structure, FIG. 7 showing a one-half-globe (globular) configuration of such structure, and FIG. 8 showing a full-globe (globular) configuration of the node shell structure. As can be seen quite readily by looking comparatively at these three figures, the FIG. 6 configuration is essentially an appropriately formed half version of the one-half-globe-configuration of FIG. 7, and the FIG. 7 configuration is essentially an appropriately formed half version of the full-globe configuration of FIG. 8.

As will be more fully explained below, the quarter-globe node shell configuration of FIG. 6 includes two tetra-facet portions (regions) that are each seating-complementary with respect to the tetra-facet cradle in a node block, the half-globe node shell configuration of FIG. 7 includes four tetra-facet portions (regions) that are each seating-complementary with respect to the tetra-facet cradle in a node block, and the full-globe node shell configuration of FIG. 8 includes eight tetra-facet portions (regions) that are each seating-complementary with respect to the tetra-facet cradle in a node block.

The various node components shown in FIGS. 1-8, inclusive, make up the herein illustrated, and still to be more fully described, system of the present of the present invention.

Figure 9:
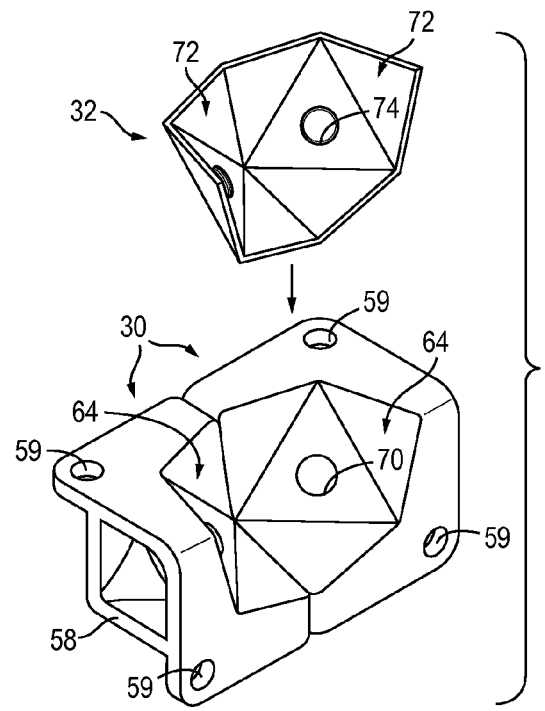

FIG. 9 is a vertically exploded, isometric view illustrating how a one-quarter-globe configuration of the node shell component structure, as pictured in FIG. 6, becomes seated in place relative to, and to join, a pair of adjacent node blocks in a frame-element nodal juncture.

Figure 10:
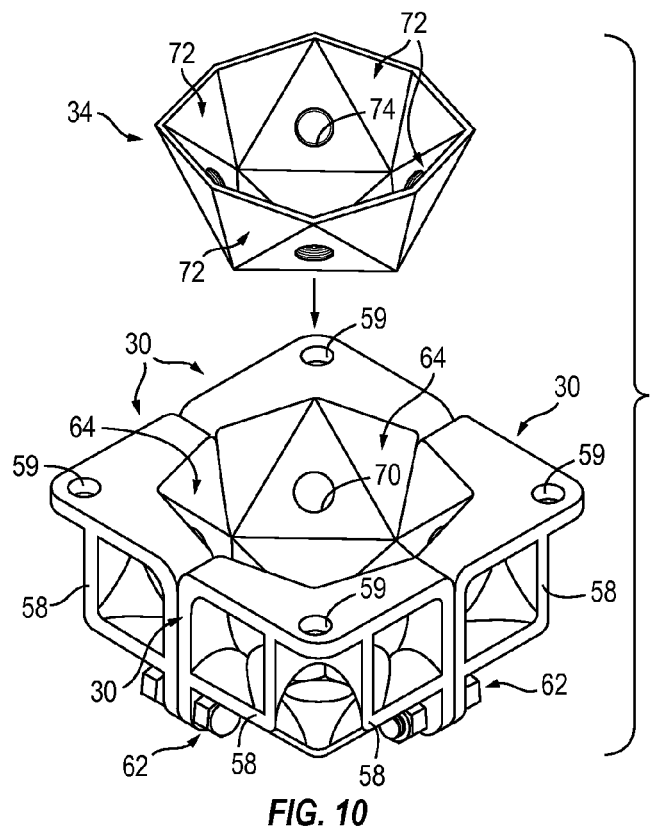

FIG. 10, which is somewhat similar to FIG. 9, is a vertically exploded, isometric view illustrating how a one-half-globe configuration of the node shell component structure, as pictured in FIG. 7, becomes seated in place relative to, and to join, four, adjacent node blocks in a frame-element nodal juncture.

Figure 11:
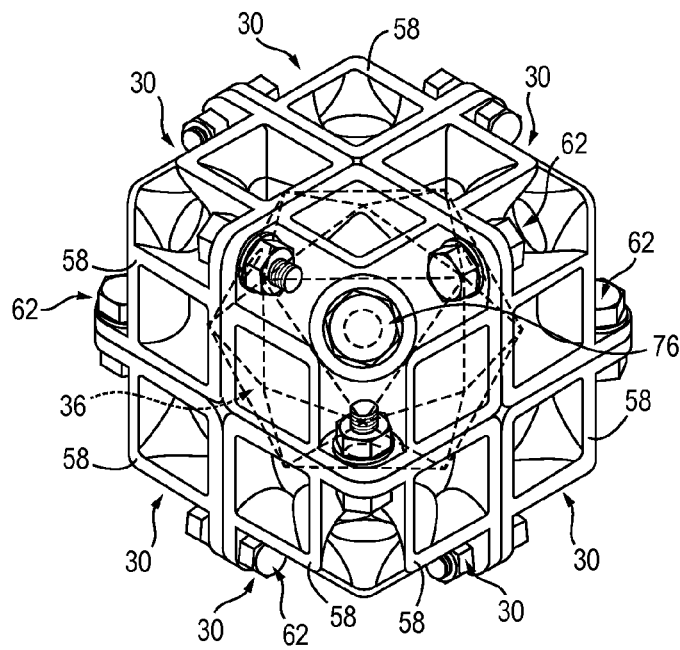

FIG. 11 illustrates how a full-globe node configuration of the node shell component structure, as pictured in FIG. 8, is in-place seated to unite eight adjacent node blocks.

FIGS. 12-15, inclusive, illustrate, respectively, an isometric view, a side elevation, and end elevation, and a top plan view, of an open, ground-supported, rectilinear frame structure constructed with nodal connections formed utilizing the block and shell node components of the system of the present invention.

Figure 12:
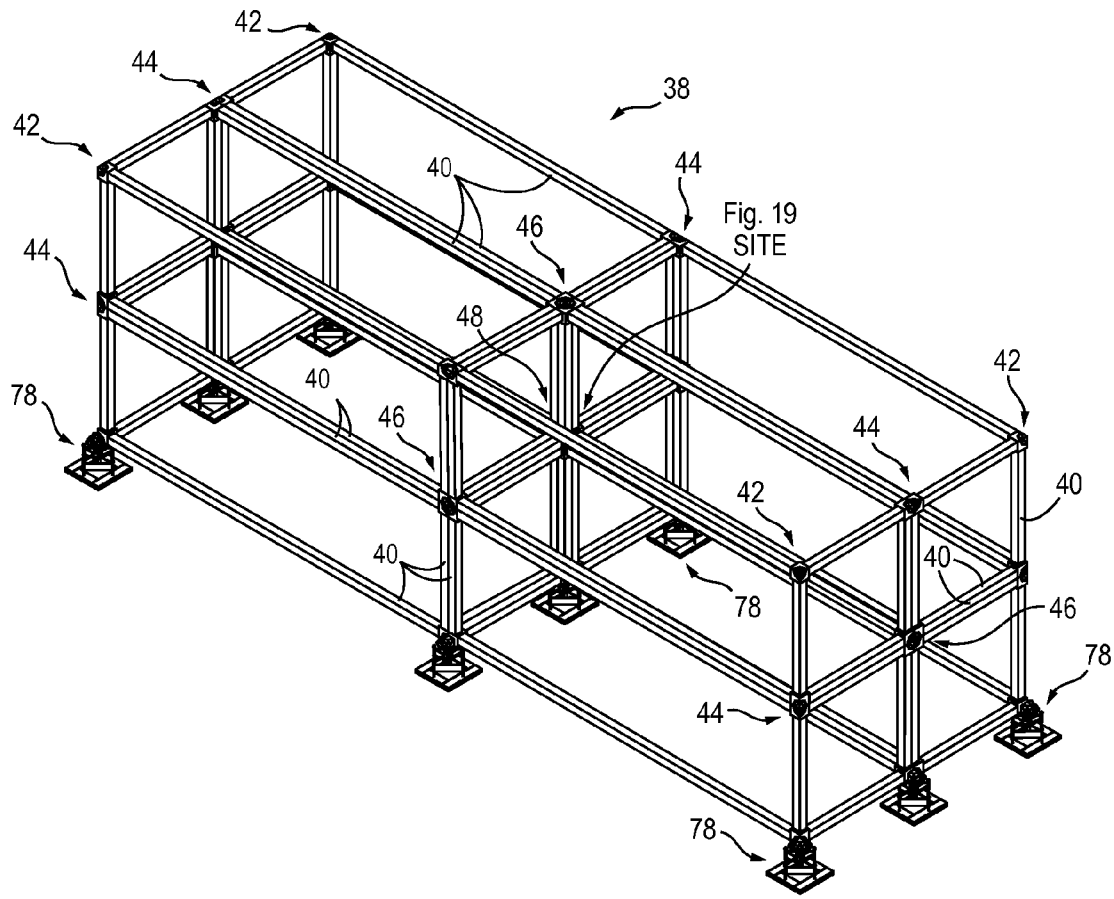
Figure 13:
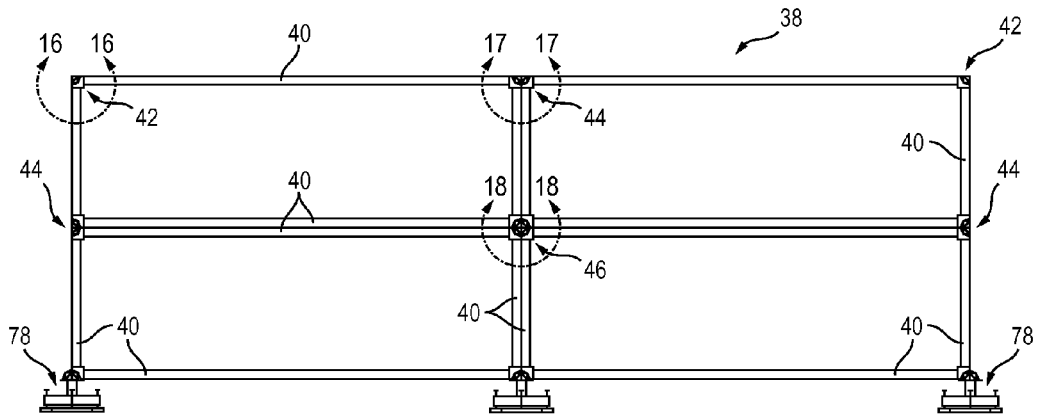
Figure 14:
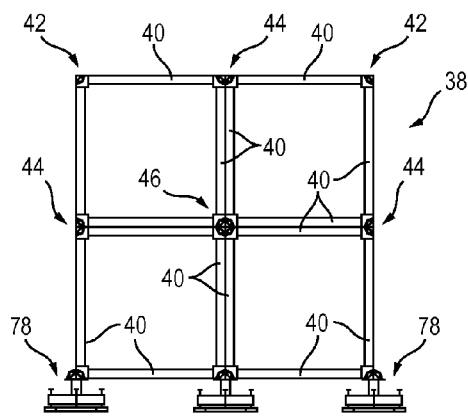
Figure 15:
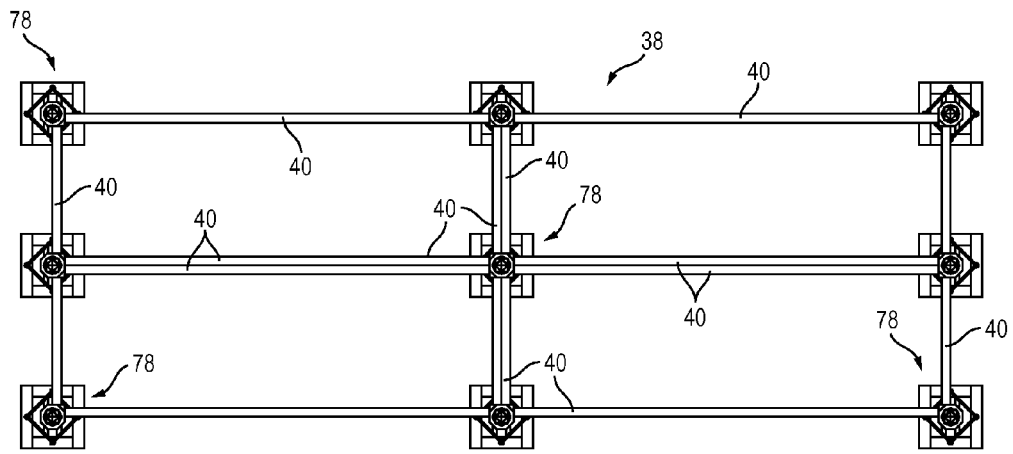
Figure 16:
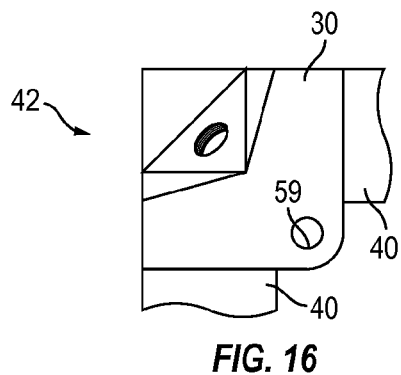

FIGS. 16-19, inclusive, present enlarged, isometric, fragmentary views showing details of the four, different node connections, or frame-element junctions, pictured within the respectively similarly numbered and highlighted view regions shown in FIGS. 12 and 13 in the frame structure of FIGS. 12-15, inclusive.

Figure 20:
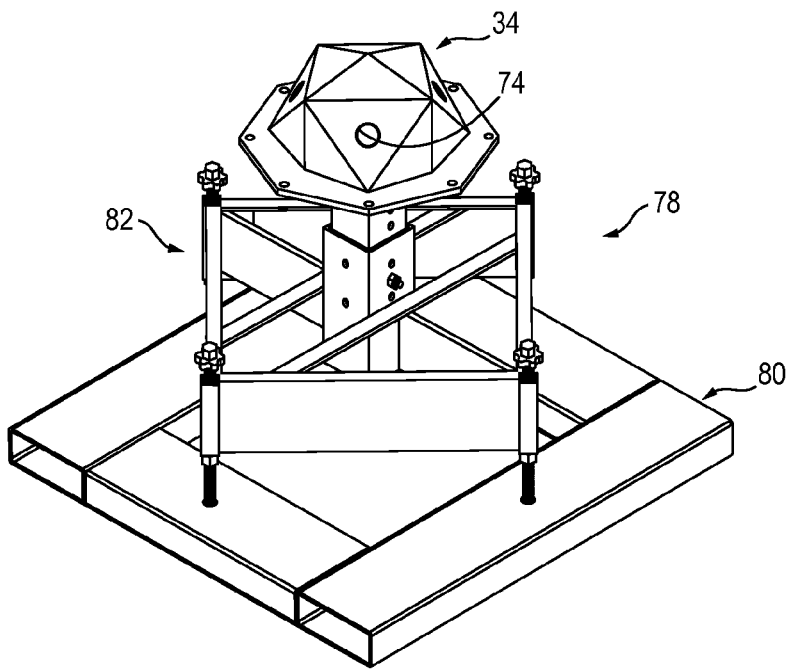

FIG. 20 presents an isolated, isometric view of a ground-support stand which is utilized herein to support, at the nine ground-support locations clearly illustrated in FIG. 12, the frame structure of FIGS. 12-15, inclusive.

Figure 21:
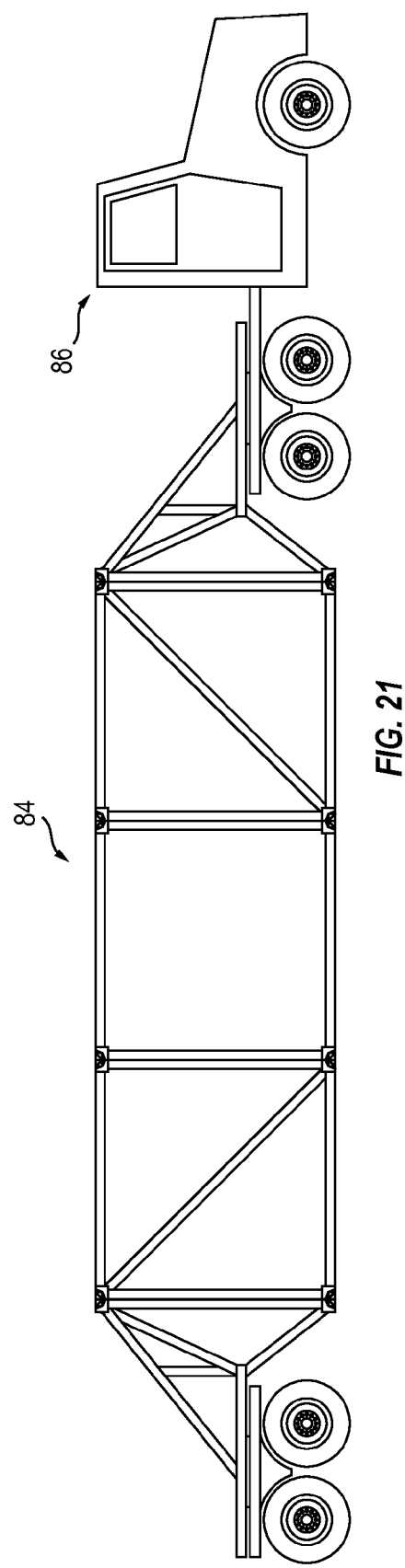

FIG. 21 is a simplified side elevation of a container frame structure constructed with the node component system of the present invention for trailerable towing behind a conventional highway tractor.

DETAILED DESCRIPTION OF THE INVENTION

Turning attention now to the drawings, and referring variously to different ones of FIGS. 1-19, inclusive, as appropriate, it is in FIGS. 1-8, inclusive, that the four, specific configurations of the two, differently styled types of faceted node components—a node block and a node shell—which collectively make up the preferred embodiment of the modular, faceted-component node, or nodal, system of the present invention, are shown. Each of FIGS. 1-5, inclusive, shows, generally at 30, a faceted node block, or node block component—also referred to herein as a first type faceted node component. FIGS. 6-8, inclusive, show, respectively, and generally at 32 (FIG. 6), 34 (FIG. 7), 36 (FIG. 8), three, different configurations of an appropriately thin-walled, faceted (concavo-convex) node shell, or shell structure, also referred to herein as a second type faceted node component.

While what will follow shortly below will include detailed verbal descriptions of these node block and node shell components, of their respective shapes/configurations, and of how they function in the forming of certain, different kinds of nodal connections in a frame structure, the respective shapes of these several components will probably best be understood by one's making a study of the views of these components provided in FIGS. 1-8, inclusive.

Still speaking in somewhat more general terms, the node, or nodal, system of the invention, which system is also referred to herein as an assembly system, and additionally as a system for forming, in a frame structure, a nodal connection between elongate structural frame elements, is illustrated herein effectively in place in an open, rectilinear, ground-supported frame structure shown at 38 in FIGS. 12-15, inclusive. Frame structure 38 includes a plurality of elongate, linear, structural frame elements, such as frame elements 40, of different appropriate lengths depending upon where in the frame structure they are located. In frame structure 38, the frame elements therein commonly take the form of square cross-section, steel tubes, though it is important to note, as was mentioned above herein, that the system of the present invention is not committed to use with just such a frame-element style.

Referring to FIGS. 16-19, inclusive, along with FIGS. 12-15, inclusive, frame structure 38, fabricated in accordance with utilization of the node components of the system of the present invention, is seen to include four different kinds of nodal, or node, connections, also referred to herein as frame-element junctures (or junctions), and as frame-element-junction nodes. These four, different kinds of nodal connections, or assemblies, are shown, respectively, at 42 (detailed in FIG. 16), 44 (detailed in FIG. 17), 46 (detailed in FIG. 18), and 48 (detailed in FIG. 19). A connection 42 constitutes a first type nodal connection (or frame-element-junction node) herein, and each of the other, three connections constitutes a second type nodal connection (or frame-element-junction node) herein. A nodal connection 42 is an outside-corner type connection in a frame structure involving the use of only a single, "first type", faceted node block component. All other nodal connections employ both types of faceted node components.

As will become apparent from still to come, further description of the present invention, and from FIGS. 12-19, inclusive, as these figures have so far been described, each connection 42 employs, as just mentioned above, but a single node block 30, and no node shell, to unite the ends of three frame elements—the above mentioned "spider" unit "building block". Each connection 44 employs two node blocks 30, and a single, block-joining (such joining still to be discussed) node shell 32 to unite the ends of six frame elements—a uniting of two of the above mentioned "spider" unit "building blocks". Each connection 46 employs four node blocks 30, and a single, block-joining (such joining also still to be discussed) node shell 34 to unite the ends of twelve frame elements—a uniting of four of the above mentioned "spider" unit "building blocks". And, a connection 48, of which there is only one in frame structure 38, employs eight node blocks 30, and a single, block-joining (such joining additionally still to be discussed) node shell 36 to unite the ends of twenty-four frame elements—a uniting of eight of the above mentioned "spider" unit "building blocks".

Nodal connections 44, 46, 48, the so-called second type, (but three-different-version) nodal connections, are also referred to herein, respectively, as a two-node-block connection version, a four-node-block connection version, and an eight-node-block connection version.

The distribution of types of nodal connections included perimetrally around the top of frame structure 38 is matched by that around the base of the frame structure.

Referring to the above-mentioned, second, special frame-structure characteristic, namely, that characteristic which may be termed as being a user-selectable, designedly differentially distributed load-bearing characteristic, one should direct attention to FIGS. 12-15, inclusive, with a special focus aimed at FIG. 12. In frame-structure regions that lie anywhere between outside corners in such a structure, i.e., in regions "encountered" progressing inwardly into the volume of a frame structure from a corner, or progressing from an outside corner along the top, the base or any side of a frame structure formed with the node system of the present invention, what one can notice, particularly by reviewing FIG. 12, is that the distributed, load-handling capacities of such frame structure regions clearly progressively increases, at least to a point, because of the progressively increasing population of nodally intersecting frame elements accommodated by—indeed, dictated by—the increasing population of present and employed node blocks and their respectively associated, united-block-and-frame-element spider units.

There is thus an interesting, "progressively-away-from-outside-corner", "growing" of frame-structure load-managing capability associated with this characteristic created by use of the node system of the invention in the formation of a frame structure—a capability offered by very evident regional increases in the numbers of present column-like and beam-like frame elements, rather than by changes made in the cross-sectional sizes of such elements. A consequence of this is that all frame elements in a frame structure may, conveniently, possess a common cross-section, with distributed load-handling robustness determined chiefly by nodal-connection types and spatial locations.

Focusing attention now on FIGS. 1-5, inclusive, node block 30, in the system as now being described, takes the form of a steel cube with special side and corner features. About this cubic nature of herein disclosed block 30, one should note that a node block may readily have a different, overall configuration depending upon user wishes. FIGS. 1-4, inclusive, show details of node block 30 configuration, and make evident that this block is designed for effective, efficient and economical use of included material. The block is appropriately sized for its intended incorporation in nodal connections to be formed in a particular structural frame, and this size is not any part of the present invention. A node block 30 is present in every node connection produced by the present invention, and, in many of such producible connections, is used in different pluralities, as mentioned above. Each node block 30 in each nodal connection is "responsible" for having endo attached to it, as by welding, and for directly uniting, and supporting, three, elongate, relatively orthogonally disposed frame elements, such as linear frame elements 40 mentioned above. Attached elements 40 extend radially outwardly from the associated block 30, and, together with this block, form what was referred to above as a "spider" unit "building block" in frame structure 38.

The cubic nature of block 30 is illustrated not only in FIG. 1-4, but also in the stylized and schematic illustration of FIG. 5. FIG. 5, which is also employed in a manner shortly to be described with respect to a particular axis-arrangement aspect of node block 30, has been drawn to represent, as well as in is possible in a two-dimensional drawing, the fact that the herein-disclosed cubic nature of block 30 is effectively defined by the intersections of six, orthogonally related planes, such as the four planes represented on edge by dash-double-dot lines 50, 52, 54, 56 in FIG. 5, as well as the two, unseen, intersecting planes, one of which is effectively the plane of FIG. 5, and the other of which lies in the background relative to the plane of this figure.

Each of three, mutually orthogonally intersecting sides of block 30 includes, as illustrated especially well in FIGS. 2 and 4, an endo attaching site 58 for attaching to the block, as by welding, an end of an adjacent frame-element 40. The three attaching sites in a node block are referred to as being orthogonal, X, Y and Z attaching sites. Fragmentary dashed lines in FIGS. 1-5, inclusive show such attached frame-element ends. Each attaching site possesses what is referred to herein as an attaching axis, 58*a*, these axes, collectively for the three sites, being referred to herein as orthogonal, X, Y and Z attaching axes, and being illustrated in FIGS. 1-5, inclusive, by dash-dot lines.

In the arrangement now being described, it turns out that axes 58*a* intersect at a common point of intersection seen at 60 in FIGS. 1 and 5, and align, as marked in FIG. 1, with the respective longitudinal axes 40*a* of attached frame elements 40.

Thin-walled corners of node block 30, in the three regions therein lying between adjacent attaching sites 58, are furnished with clearance throughbores 59 that open to three, flat, outer sides of the block. as can be seen well in FIGS. 1 and 3. These throughbores are usable, with appropriately installed nut-and-bolt assemblies, to enhance anchoring attachments between flat-side-adjacent node blocks present in the above-mentioned two-block, four-block and eight-block nodal connections. Such nut-and-bolt assemblies are shown at 62 in FIGS. 10, 11 and 19 with respect to node blocks so arranged with flat outer sides confronting and contacting one another. Nut-and-bolt assemblies 62 are also present in the nodal assemblies shown in FIGS. 9, 17 and 18, but are hidden from view in these figures.

Continuing with a description of node block 30, what may be viewed as a "missing" diagonal corner region in the block, i.e., that "corner" which faces the viewer in FIGS. 1 and 3, and which can be seen turned somewhat to the right in FIG. 5, is formed with a concave, outwardly facing, angularly faceted, four-facet cradle 64, referred to herein as a tetra-facet cradle. Cradle 64 includes a central, planar facet 66 in the form of an equilateral triangle, the sides of which join coextensively, through common obtuse angles of about 145-degrees, with the bases of three, outwardly extending, flanking, planar, isosceles-triangle facets 68 of equal size. Facets 66, 68 are also referred to herein as faceted surface regions in the node block. Central facet 66 includes a central, bolt-shank-clearance throughbore 70 having an axis 70*a*, which axis constitutes a corner-to-opposite-corner diagonal in the node block. Axis 70*a* herein intersects previously mentioned axes 58*a* at common intersection point 60. Throughbore 70 accommodates clearance passage of a threaded bolt (to be mentioned later herein) associated with attachment of the node block to a node shell in a nodal connection involving both plural node blocks and a linked node shell. Tetra-facet cradle 64 is centered on, and symmetrical with respect to, axis 70*a*.

In the system embodiment of the present invention now being described, the four-axis, common intersection point 60 herein "sits", as can be seen well in FIG. 5, within the virtual cubic volume which is defined for a node block 30 by the six, orthogonally intersecting planes discussed in relation to FIG. 5.

FIGS. 6-8, inclusive, illustrate the three different kinds of concavo-convex node shell configurations proposed by the present invention. FIGS. 9-11, inclusive, and 17-19, inclusive, illustrate, differently, relevant portions of isolated, prospective (FIGS. 9 and 10), and existing (FIGS. 11 and 17-19, inclusive) node connections in which these three node shell configurations are employed with different pluralities of node blocks.

Focusing attention particularly on FIGS. 6-8, inclusive, it will be useful, at this point, to make the comment that, in many ways, the tetra-facet cradle structure formed in a node block herein effectively defines the node-block-collaborating shapes of each of the three, respectively different configurations of a node shell. In this regard, a careful look at the relevant drawing figures herein (FIGS. 1, 3, and 6-9, inclusive) will reveal, the existing fact in the presently-being-described embodiment of the invention, that the concave, tetra-facet cradle configuration provided in a node block is effectively "mirrored" convexly, and with identical, adjacent-facet angular dispositions, in the planar, angularly faceted constructions that respectively define each of the three, different configurations of a node shell. In fact, each node shell, which, as can be seen, possesses a completely angularly-planar-faceted structure, is formed with different pluralities of adjacent, planar-facet, tetra-facet portions, the outer sides of which, i.e., those facet sides which are on the convex sides of the respective shell configurations, play the important functional roles of seating, or nesting, complementarily, and with proper, matching dimensional coextensivity in a facet-to-facet, facet-confronting manner, with the concavely organized faceted condition of a node block tetra-facet cradle.

Respecting the three, different, specific node shell forms, or configurations, one of these configurations, as can be seen at 36 in FIG. 8, has the appearance somewhat of a geodesic dome, or full-globe, and may be described as having a faceted surface structure with contiguous, convex, tetra facet regions each of which is complementary with respect to the tetra facet cradle present in the node block component of the invention. The other two forms of node shell structures take the forms, respectively, of a half-globe portion of the mentioned full-globe shell structure, as seen at 34 in FIG. 7, and a one-quarter-globe portion of the same full-globe node structure, as seen at 32 in FIG. 6.

The one-quarter-globe shell configuration 32 (FIG. 6) possesses two, adjacent, or contiguous, tetra-facet regions 72. The one-half-globe shell configuration 34 (FIG. 7) possesses four, exactly similar, adjacent, contiguous tetra-facet regions 72. The full-globe shell configuration 36 (FIG. 8) possesses eight, exactly similar, adjacent, contiguous tetra-facet regions 72, four of which only are marked in FIG. 8. All adjacent facets in each node shell configuration are disposed with their respective planes intersecting herein at the same common angle of about 145-degrees mentioned earlier.

This important, node-block/node-shell matching tetra-facet condition results in the fact that a node shell employed with the appropriate number of node blocks with respect to which it is intended to function offers a properly convexly faceted configuration, wherein tetra-facet portions in the shell seat, or nest, complementarily, angularly properly, and correctly dimensionally coextensively, in adjacent tetra-facet cradles in the appropriate number of node blocks.

Appropriately threaded throughbores 74 are provided centrally in the central equilateral-triangle facets in each tetra-facet region in each node shell configuration. With a node shell properly seated respecting its intended, associated plurality of node blocks, the associated throughbores 70, 74 align with one another, and bolts, such as those shown at 76 in FIGS. 11 and 17-19, respectively, are inserted, with clearance through throughbores 70, to become screw-tightened in threaded throughbores 74 so as to anchor the associated node shells and node blocks in a joined condition respecting one another.

The exploded views of FIGS. 9 and 10 clearly illustrate, respectively, how a node shell component 32, and a node shell component 34 are placed to become seated and nested within adjacent tetra-facet cradles in two-node-block and four-node-block, nodal connections, then to become anchored through appropriate bolting to these blocks via bolts 76. FIG. 11 shows, with appropriately included node-shell-illustrating dashed lines, completed uniting of eight node blocks around the convex, tetra-faceted surface regions in a fully enclosed, core-positioned full-globe-configuration node shell 36.

Figure 17:
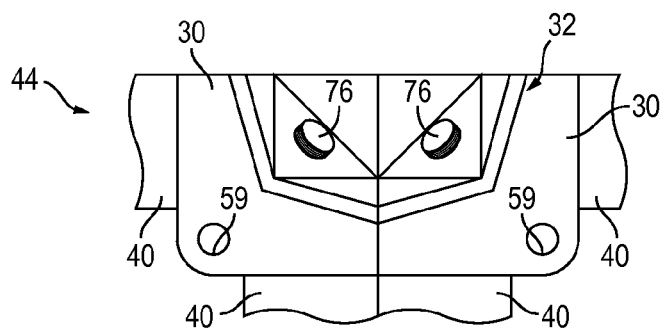
Figure 18:
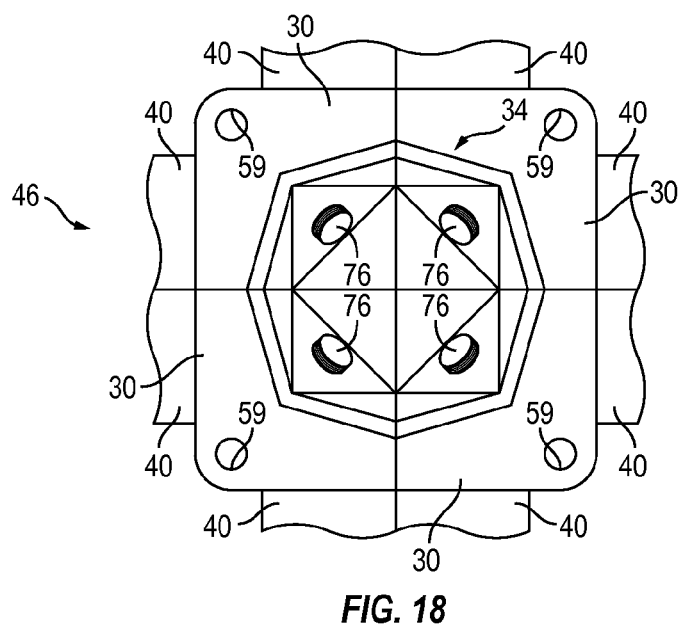
Figure 19:
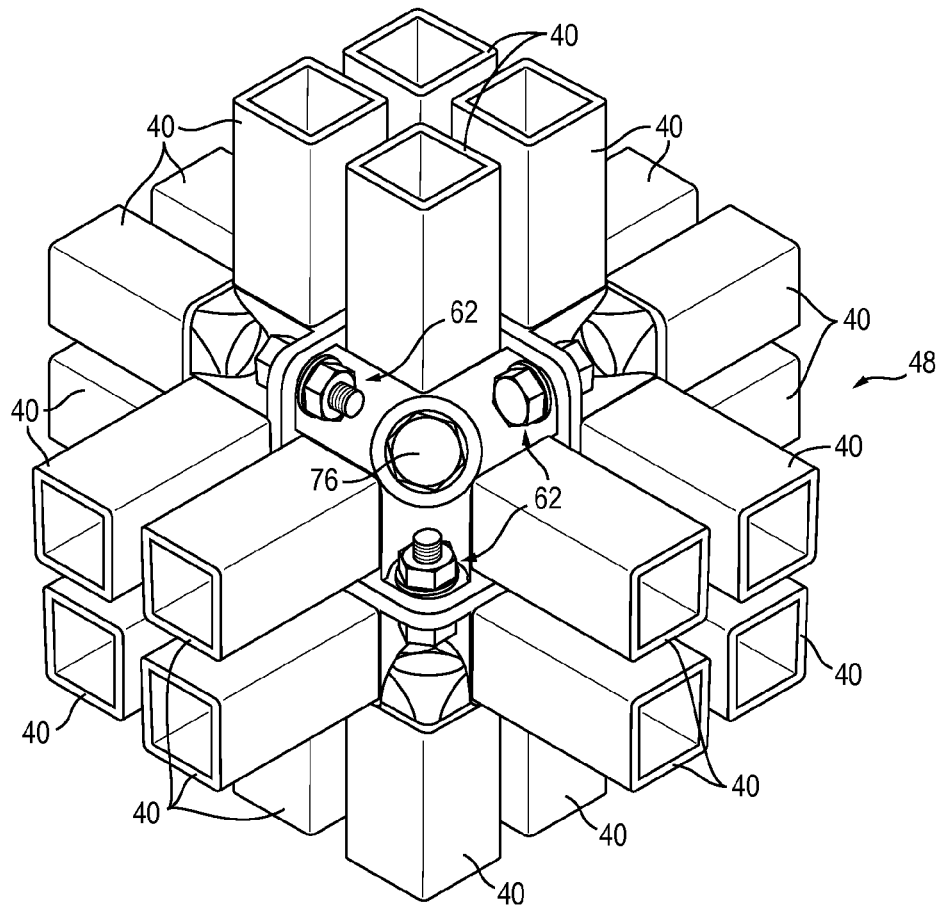

FIGS. 17-19 show completed, "second type" nodal connections including, respectively, a node shell component 32, a node shell component 34, and a hidden node shell component 36.

Mentioned earlier herein, especially with respect to FIG. 5, are the several axes designated 40*a*, 58*a* and 70*a*, and how they relate to one another spatially in terms of having a common point 60 of intersection in the local context of node block connections existing with the ends of frame elements 40. These relationships, in the embodiment of the present invention now being described, are associated with how frame-structure loads are transmitted into and through nodal connections. Also of interest in relation to nodal load transmission and handling is the additional fact that in a full-globe-style nodal connection, as seen in FIGS. 11 and 19, all axes 70*a* intersect at a common point (hidden from view in these drawing figures) which is exactly centered within a full-globe node shell 36.

Directing attention now to FIG. 20 along with FIGS. 12-15, inclusive, as was mentioned earlier herein, frame structure 38 is ground-supported. Directly providing this support are nine support stands designated 78 in the drawings. One of these stands is shown in an isolated manner in FIG. 20, and in this figure, can be seen to include a ground-contacting base 80, a suitably, vertically adjustable pedestal structure 82, and, appropriately anchored to the top of pedestal structure 82, an upwardly, convexly disposed node shell component 34 to which node connections on the underside of frame structure 38 are suitably anchored, as by previously described bolts 76.

Looking finally at FIG. 21, here there is shown a container frame structure 84, the rectilinear portion of which is constructed utilizing the node component system of the present invention for trailerable towing behind a conventional highway tractor designated 86 in this figure.

It will be evident from the preferred-embodiment description of the present invention given above, read in conjunction with all of the accompanying drawings, that the system node components are relatively simple in construction, and quite versatile in terms of how they may be used in relation to one another to create effective nodal junctions, or connections between elongate frame elements in the formation of a frame structure. The unique, faceted nature of these components, and referring particularly to situations in nodal connections wherein both node block and node shell components are employed cooperatively, results in high-positional-registry, component-positional formations of very simple, and quite effective and efficient (in terms of load-handling) nodal connections, not only because of the various axial alignments and intersections mentioned herein, but also because of the concave and convex, tetra-faceted nesting which occurs—node-shell-to-node-block. Confronting facets in a block/shell nested condition cooperate handily and effectively in the handling and transmission of structural-frame-borne loads.

The structural natures of the node block and node shell components, as discussed above, contribute additionally to the spider-unit building-block, and differentially distributed load-bearing capability, concepts that characterize aspects of a frame structure formed with these components.

While a very specific faceted arrangement has been proposed in accordance with a preferred embodiment of the system of the present invention, I recognize that other kinds of faceted arrangements having similar operational and design-offering capabilities may be set forth and employed in a manner which will enable the fabrication of frame-structure nodal connections that are equally effective. Further, and as was noted earlier herein, it will be evident to those skilled in the relevant art that the node components proposed herein are readily scalable to deal with different sizes and kinds of frame structures.

Accordingly, while the system of the invention has been described in conjunction with a collection of preferred features which have been found to offer a very high degree of utility in the formation of frame-structure nodal connections, variations and modifications are certain recognized to be possible which will come within the spirit of the present invention, and it is my intention that the claims to invention presented herein will be interpreted appropriately to cover such variations and modifications.

I claim:

1. A modular, faceted-component node system for uniting adjacent ends of elongate frame elements at selectively different types of frame-element-junction nodes in a frame structure, comprising
   a first type faceted node component adapted for attachments to it of ends of plural, elongate frame elements, operable as a singularity to form in a frame structure a first-type frame-element-junction node, and
   a second type faceted node component for joining, and cooperating with, different pluralities of said first-type node component to form, selectively with such component pluralities, in a frame structure a plurality of different, second-type frame-element-junction nodes,
   said first and second type node components including, respectively, concave and convex, angularly faceted surface regions that are complementary to one another, and that accommodate facet-to-facet, matching-facet-coextensive, selective joinder of the two node component types, wherein said first type node component takes the form of a node block which includes an outwardly facing, faceted cradle formed with plural, adjacent, planar facets, and outwardly facing, frame-element attaching sites, with each attaching site being designed to accommodate endo-attachment to the block of an elongate frame element, and said second type node component takes the form of a faceted shell structure formed with plural, adjacent, planar facets, shaped and adapted for joining plural, adjacent node blocks whose cradles are adjacent one another through anchored, coextensive, facet-to-facet, complementarily-nested seating of the shell structure in the adjacent cradles in adjacent blocks.

2. The system of claim 1, which is specifically structured for uniting adjacent ends of elongate, orthogonally related frame elements, and wherein said first type node component is configured to receive endo attachments of the ends of such elements.

3. The system of claim 1, wherein, respectively, (a) the planes of all adjacent cradle facets in the node block, and (b) the planes of all adjacent facets in the shell structure, intersect one another at a common, obtuse angle.

4. The system of claim 1, wherein, respectively, (a) the planes of all adjacent cradle facets in the node block, and (b) the planes of all adjacent facets in the shell structure, intersect one another at a common, obtuse angle of about 145-degrees.

5. The system of claim 1, wherein said cradle is a tetra-facet cradle, and said shell structure is formed with plural, tetra-facet portions each of which is complementarily fittable within said tetra-facet cradle.

6. The system of claim 5, wherein each of said tetra-facet cradle and said tetra-facet portions possesses a central facet in the form of an equilateral triangle whose sides join coextensively with bases of three, flanking, isosceles-triangle facets.

7. A modular node system featuring interengageable, faceted node components for interconnecting elongate frame elements having ends and long axes, said system and included components, comprising
   a node block including (1) an outwardly facing, faceted cradle formed with plural, adjacent, planar facets, and (2) outwardly facing, X, Y and Z frame-element attaching sites defining orthogonal, X, Y and Z attaching axes, each attaching site being designed to accommodate endo-attachment to the block of an elongate frame element with the long axis of such an attached element substantially coinciding with the attaching axis defined by the site, said attaching axes meeting at an intersection point which is spaced outwardly of the block relative to, and contained within a line extending centrally from, said cradle, and said sites being configured whereby a frame element attached to a site extends in its entirety from the node block oppositely away from both the cradle and the intersection point, and
   faceted shell structure formed with plural, adjacent, planar facets, shaped and adapted for joining plural, adjacent node blocks whose cradles are adjacent one another through anchored, coextensive, facet-to-facet, complementarily-nested seating of the shell structure in the adjacent cradles in adjacent blocks.

8. The system of claim 7, wherein said node block, under circumstances with three elongate elements attached, collaboratively with these elements forms a spider-unit building-block employable in a frame structure.

9. The system of claim 7, wherein, respectively, (a) the planes of all adjacent cradle facets in the node block, and (b) the planes of all adjacent facets in the shell structure, intersect one another at a common, obtuse angle.

10. The system of claim 7, wherein, respectively, (a) the planes of all adjacent cradle facets in the node block, and (b) the planes of all adjacent facets in the shell structure, intersect one another at a common, obtuse angle of about 145-degrees.

11. The system of claim 7, wherein said node block is generally cubic in nature and defined, at least in part, by orthogonally intersecting planes which collectively define a nominal cubic volume, and said line extends diagonally, in a corner-to-opposite-corner fashion, through said volume.

12. The system of claim 7, wherein said node block is generally cubic in nature and defined, at least in part, by orthogonally intersecting planes which collectively define a nominal cubic volume, and said intersection point is disposed within said volume.

13. The system of claim 7, wherein said cradle is a tetra-facet cradle, and said shell structure is formed with plural, tetra-facet portions each of which is complementarily fittable within said tetra-facet cradle.

14. The system of claim 13, wherein each of said tetra-facet cradle and said tetra-facet portions possesses a central facet in the form of an equilateral triangle whose sides join coextensively with bases of three, flanking, isosceles-triangle facets.

15. The system of claim 13, wherein said tetra-facet cradle and said shell-structure tetra-facet portions possess commonly sized, central facets which are centrally apertured with throughbores to accommodate bolted, node-block/shell-structure joiner associated with appropriate, combined central-facet and central throughbore alignment.

16. The system of claim 15, wherein the throughbores in said shell-structure tetra-facet portions are threaded.

17. The system of claim 7, wherein said node block and said shell structure are configured to function variously to form, in a frame structure, different, first and second types of frame-element-junction nodes, and said shell structure has a faceted, quarter-globe configuration adapted for joining a pair of node blocks to form a two-node-block version of a second-type frame-element-junction node.

18. The system of claim 17, wherein said quarter-globe shell-structure configuration possesses a pair of equilateral-triangle facets each flanked by three isosceles-triangle facets.

19. The system of claim 7, wherein said node block and said shell structure are configured to function variously to form, in a frame structure, different, first and second types of frame-element-junction nodes, and said shell structure has a faceted, half-globe configuration adapted for joining four node blocks to form a four-node-block version of a second-type frame-element-junction node.

20. The system of claim 19, wherein said half-globe shell-structure configuration possesses two pairs of equilateral-triangle facets each flanked by three isosceles-triangle facets.

21. The system of claim 7, wherein said node block and said shell structure are configured to function variously to form, in a frame structure, different, first and second types of frame-element-junction nodes, and said shell structure has a faceted, full-globe configuration adapted for joining eight node blocks to form an eight-node-block version of a second-type frame-element-junction node.

22. The system of claim 21, wherein said full-globe shell-structure configuration possesses four pairs of equilateral-triangle facets each flanked by three isosceles-triangle facets, and wherein each isosceles-triangle facet is flanked by two isosceles-triangle facets and a single equilateral-triangle facet.

* * * * *